United States Patent
Agarwal (10) Patent No.: US 11,089,471 B2
(45) Date of Patent: Aug. 10, 2021

(54) IDENTIFIER MAPPING IN EDGE COMPUTING WITHIN RADIO NETWORKS

(71) Applicant: Nokia Solutions and Networks Oy, Espoo (FI)

(72) Inventor: Salil Agarwal, Karnataka (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/630,220

(22) PCT Filed: Jul. 11, 2018

(86) PCT No.: PCT/EP2018/068727
§ 371 (c)(1),
(2) Date: Jan. 10, 2020

(87) PCT Pub. No.: WO2019/011953
PCT Pub. Date: Jan. 17, 2019

(65) Prior Publication Data
US 2020/0137560 A1 Apr. 30, 2020

(30) Foreign Application Priority Data
Jul. 12, 2017 (IN) .............................. 201711024551

(51) Int. Cl.
*H04W 8/26* (2009.01)
*H04L 29/12* (2006.01)
*H04W 88/16* (2009.01)

(52) U.S. Cl.
CPC .......... *H04W 8/26* (2013.01); *H04L 61/6054* (2013.01); *H04W 88/16* (2013.01)

(58) Field of Classification Search
CPC ...... H04W 8/26; H04W 88/16; H04L 61/6054
See application file for complete search history.

(56) References Cited

U.S. PATENT DOCUMENTS

| 2012/0036559 | A1* | 2/2012 | Zabawskyj | ........... | H04W 12/08 726/4 |
| 2012/0272266 | A1* | 10/2012 | Ou | .......................... | H04L 67/20 725/34 |
| 2016/0255465 | A1 | 9/2016 | Zhu | | |
| 2016/0295398 | A1 | 10/2016 | Ketheesan et al. | | |
| 2017/0201571 | A1* | 7/2017 | Sherf | .................. | H04L 43/0817 |
| 2018/0006954 | A1* | 1/2018 | Arora | .................. | H04L 12/1407 |
| 2019/0098490 | A1* | 3/2019 | Jin | ...................... | H04L 63/0876 |

FOREIGN PATENT DOCUMENTS

WO 2016/070633 A1 5/2016

OTHER PUBLICATIONS

International Search Report and Written Opinion received for corresponding Patent Cooperation Treaty Application No. PCT/EP2018/068727, dated Sep. 26, 2018, 17 pages.

\* cited by examiner

*Primary Examiner* — Ernest G Tacsik
(74) *Attorney, Agent, or Firm* — Harrington & Smith (57) ABSTRACT

A technique, comprising: obtaining, via a gateway entity linking a radio access network to a core network associated with the radio access network, information about mapping at the core network of one or more temporary user identifiers to one or more permanent user identifiers.

16 Claims, 4 Drawing Sheets

IDENTIFIER MAPPING IN EDGE COMPUTING WITHIN RADIO NETWORKS

RELATED APPLICATION

This application was originally filed as Patent Cooperation Treaty Application No. PCT/EP2018/068727 filed Jul. 11, 2018 which claims priority benefit to India Patent Application No. 201711024551, filed Jul. 12, 2017.

The operation of computing entities (for serving one or more communication devices via a radio access network) at the edge of the radio access network (i.e. without routing of data flows between the computing entities and the communication devices via the core network associated with the radio access network) can have advantages in terms of e.g. reducing latency.

Providing information to these edge computing entities about one or more radio conditions in the radio access network can facilitate the operation of these edge computing entities. This may involve linking such radio network information to one or more temporary identifiers (e.g. IP address or tunnel end point address) by which the edge computing entities identify the communication devices for which they provide services via the radio access network.

The inventor for the present application has identified a potential advantage in linking such radio network information more closely to the one or more communication devices to which it relates.

There is hereby provided a method, comprising: obtaining, via a gateway entity linking a radio access network to a core network associated with the radio access network, information about mapping at the core network of one or more temporary user identifiers to one or more permanent user identifiers.

According to one embodiment, the method further comprises: linking to the one or more temporary user identifiers one or more third user identifiers respectively mappable to the one or more permanent user identifiers, and informing a radio network information service entity of the linking between the one or more temporary user identifiers and the one or more third identifiers, for use by the radio network information service entity when providing radio network information related to the one or more temporary identifiers to one or more computing entities, which one or more computing entities serve one or more communication devices via the radio access network without routing via the core network.

According to one embodiment, the method further comprises receiving from one of said computing entities a user profile information request specifying one or more of said third identifiers; and sending to a user database a user profile information request specifying the one or more permanent identifiers mappable to said one or more third identifiers.

According to one embodiment, said sending is conditional on determining that said computing entity is authorised to receive user profile information.

According to one embodiment, the method further comprises: receiving user profile information from said user database; and sending at least part of said received user profile information to said computing entity.

According to one embodiment, the method further comprises: obtaining user profile information for one or more of said temporary user identifiers from a user database via the one or more permanent user identifier mapped to the one or more temporary user identifiers, and providing the user profile information for the one or more temporary user identifiers to one or more computing entities, which one or more computing entities serve one or more communication devices via the radio access network without routing via the core network.

According to one embodiment, the method further comprises: providing information about the one or more permanent identifiers mapped to one or more of said temporary identifiers to one or more computing entities, which one or more computing entities serve one or more communication devices via the radio access network without routing via the core network.

According to one embodiment, said providing information to one or more computing entities is conditional on determining that said one or more computing entities are authorised to receive said information.

There is also hereby provided a method, comprising: providing radio network information associated with one or more temporary user identifiers to one or more computing entities serving one or more communication devices via the radio access network without routing via the core network; and providing to said one or more computing entities information about a link between said one or more temporary user identifiers and one or more third identifiers respectively mappable to one or more permanent identifiers to which said one or more temporary user identifiers are mapped at the core network.

There is also hereby provided a method, comprising: receiving radio access network information associated with one or more temporary user identifiers at a computing entity serving one or more communication devices via the radio access network without routing via a core network associated with the radio access network; receiving information about linking between said one or more temporary user identifiers and one or more third identifiers respectively mappable to one or more permanent identifiers to which said one or more temporary user identifiers are mapped at the core network; and linking said network information associated with the one or temporary user identifiers to the one or more third identifiers.

There is also hereby provided an apparatus comprising: a processor and memory including computer program code, wherein the memory and computer program code are configured to, with the processor, cause the apparatus to: obtain, via a gateway entity linking a radio access network to a core network associated with the radio access network, information about mapping at the core network of one or more temporary user identifiers to one or more permanent user identifiers.

According to one embodiment, the memory and computer program code are further configured to, with the processor, cause the apparatus to: link to the one or more temporary user identifiers one or more third user identifiers respectively mappable to the one or more permanent user identifiers, and inform a radio network information service entity of the linking between the one or more temporary user identifiers and the one or more third identifiers, for use by the radio network information service entity when providing radio network information related to the one or more temporary identifiers to one or more computing entities, which one or more computing entities serve one or more communication devices via the radio access network without routing via the core network.

According to one embodiment, the memory and computer program code are further configured to, with the processor, cause the apparatus to: receive from one of said computing entities a user profile information request specifying one or more of said third identifiers; and send to a user database a user profile information request specifying the one or more permanent identifiers mappable to said one or more third identifiers.

According to one embodiment, said sending is conditional on the apparatus determining that said computing entity is authorised to receive user profile information.

According to one embodiment, the memory and computer program code are further configured to, with the processor, cause the apparatus to: receive user profile information from said user database; and send at least part of said received user profile information to said computing entity.

According to one embodiment, the memory and computer program code are further configured to, with the processor, cause the apparatus to: obtain user profile information for one or more of said temporary user identifiers from a user database via the one or more permanent user identifier mapped to the one or more temporary user identifiers, and provide the user profile information for the one or more temporary user identifiers to one or more computing entities, which one or more computing entities serve one or more communication devices via the radio access network without routing via the core network.

According to one embodiment, the memory and computer program code are further configured to, with the processor, cause the apparatus to: provide information about the one or more permanent identifiers mapped to one or more of said temporary identifiers to one or more computing entities, which one or more computing entities serve one or more communication devices via the radio access network without routing via the core network.

According to one embodiment, said providing information to one or more computing entities is conditional on the apparatus determining that said one or more computing entities are authorised to receive said information.

There is also hereby provided an apparatus comprising: a processor and memory including computer program code, wherein the memory and computer program code are configured to, with the processor, cause the apparatus to: provide radio network information associated with one or more temporary user identifiers to one or more computing entities serving one or more communication devices via the radio access network without routing via the core network; and provide to said one or more computing entities information about a link between said one or more temporary user identifiers and one or more third identifiers respectively mappable to one or more permanent identifiers to which said one or more temporary user identifiers are mapped at the core network.

There is also hereby provided an apparatus comprising: a processor and memory including computer program code, wherein the memory and computer program code are configured to, with the processor, cause the apparatus to: receive radio access network information associated with one or more temporary user identifiers at a computing entity serving one or more communication devices via the radio access network without routing via a core network associated with the radio access network; receive information about linking between said one or more temporary user identifiers and one or more third identifiers respectively mappable to one or more permanent identifiers to which said one or more temporary user identifiers are mapped at the core network; and link said network information associated with the one or temporary user identifiers to the one or more third identifiers.

There is also hereby provided an apparatus, comprising: means for obtaining, via a gateway entity linking a radio access network to a core network associated with the radio access network, information about mapping at the core network of one or more temporary user identifiers to one or more permanent user identifiers.

There is also hereby provided an apparatus, comprising: means for providing radio network information associated with one or more temporary user identifiers to one or more computing entities serving one or more communication devices via the radio access network without routing via the core network; and means for providing to said one or more computing entities information about a link between said one or more temporary user identifiers and one or more third identifiers respectively mappable to one or more permanent identifiers to which said one or more temporary user identifiers are mapped at the core network.

There is also hereby provided an apparatus, comprising: means for receiving radio access network information associated with one or more temporary user identifiers at a computing entity serving one or more communication devices via the radio access network without routing via a core network associated with the radio access network; means for receiving information about linking between said one or more temporary user identifiers and one or more third identifiers respectively mappable to one or more permanent identifiers to which said one or more temporary user identifiers are mapped at the core network; and means for linking said network information associated with the one or temporary user identifiers to the one or more third identifiers.

There is also hereby provided a computer program product comprising program code means which when loaded into a computer controls the computer to: obtain, via a gateway entity linking a radio access network to a core network associated with the radio access network, information about mapping at the core network of one or more temporary user identifiers to one or more permanent user identifiers.

There is also hereby provided a computer program product comprising program code means which when loaded into a computer controls the computer to: provide radio network information associated with one or more temporary user identifiers to one or more computing entities serving one or more communication devices via the radio access network without routing via the core network; and provide to said one or more computing entities information about a link between said one or more temporary user identifiers and one or more third identifiers respectively mappable to one or more permanent identifiers to which said one or more temporary user identifiers are mapped at the core network.

There is also hereby provided a computer program product comprising program code means which when loaded into a computer controls the computer to: receive radio access network information associated with one or more temporary user identifiers at a computing entity serving one or more communication devices via the radio access network without routing via a core network associated with the radio access network; receive information about linking between said one or more temporary user identifiers and one or more third identifiers respectively mappable to one or more permanent identifiers to which said one or more temporary user identifiers are mapped at the core network; and link said network information associated with the one or temporary user identifiers to the one or more third identifiers.

Embodiments are described in detail hereunder, by way of example only, with reference to the accompanying drawings, in which.

An embodiment of the invention is described below for the example of a 3GPP Long Term Evolution (LTE) communication system, but the same kind of technique can be used with other communication systems.

Figure 1:
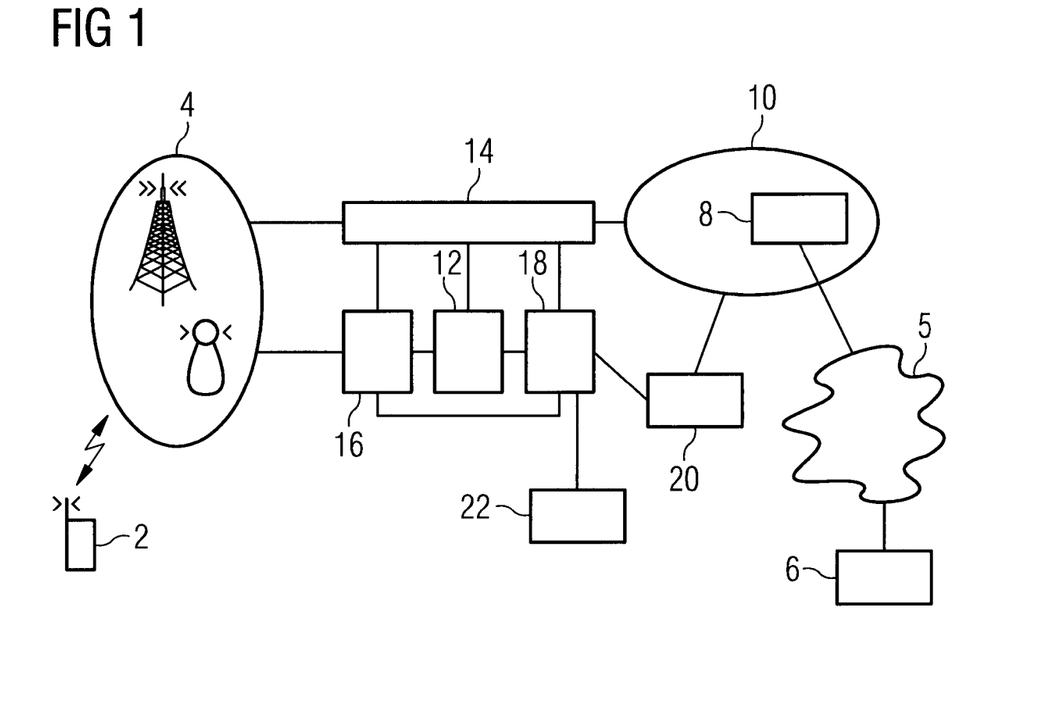
FIG. 1 illustrates one example of a system using edge computing, according to an embodiment of the present invention.

In the example system of FIG. 1, applications, services or content for one or more user equipments (UEs) 2 via a radio access network 4 (comprising one or more base stations (eNodeBs)) are either (a) provided by external servers 6 via the internet 5 and a packet data network gateway (PDNG) 8 of a centralized core network 10 (Evolved Packet Core EPC 10) associated with the radio access network 4, or (b) provided by edge servers 12 running in isolation from the EPC 10 associated with the radio access network 4. An edge server 12 is an example of a computing entity that may run e.g. one or more applications at the edge of the radio access network. Data flows to/from UEs 2 for applications, services or content hosted in the edge servers 12 do not go via the EPC 10. Traffic from UEs 2 relating to applications, services or content hosted in the edge servers 12 are directed at a de-centralised or distributed data plane gateway 14 (forming part of the radio access network 4 or between the radio access network 4 and the EPC 10) to the edge servers 12, and all other traffic from UEs 2 is routed to the EPC 10.

The EPC 10 includes additional entities (not shown) such as a serving gateway entity (SGW), a mobile management entity (MME), a home subscriber server (HSS), and one or more other functional entities.

The radio access network 4 comprises base stations each operating one or more cells, which may be of different types and sizes.

A radio network information service entity 16 receives information from the radio access network 4 about e.g. cell load, congestion, UE radio measurements and handover events, and provides this information to the edge servers 12.

Data flows related to applications, services and content hosted by the edge servers 12 for one or more UEs 2 via the radio access network 4 are linked to those UEs 2 by means of temporary identifiers (such as an Internet Protocol (IP) address allocated to the UEs 2 by the PDNG entity 8 of the EPC 10 and/or General Packet Radio Service (GPRS) Tunnelling Protocol (GTP) tunnel IDs allocated to the UEs 2 by the radio access network and the SGW (not shown), mentioned above, of the EPC 10. The SGW may also be physically deployed outside the EPC 10, e.g. at the edge of the radio access network as part of the distributed plane gateway 14. Radio network information provided by the RNIS 16 may be linked to data flows for one or more UEs 2 by means of these temporary identifiers.

These temporary identifiers are not permanently linked to a UE 2, and the temporary identifier allocated to a UE for one session of attachment to the radio access network 4 may not be the same as the temporary identifier allocated to the same UE 2 for a later session of attachment to the radio access network 4. Permanent identifiers (such as e.g. International Mobile Subscriber Identity—IMSI) are used to uniquely identify UEs 2, but these permanent identifiers are not included in data flows between the UEs and the edge servers 12.

The system shown in FIG. 1 further includes a User Identity Service entity 18. An example of the operations of the UIS entity 18 is described in detail below, but some functions of the UIS entity 18 include: obtaining information via the data plane gateway 14 about the mapping of temporary identifiers (e.g. IP addresses) to permanent identifiers (e.g. IMSI) at the PDNG 8; linking the permanent identifiers (mapped to the temporary identifiers currently in use) to intermediate identifiers, which shall hereafter be referred to as "associateIds"; and providing information to the RNIS 16 about linking of the associateIds to the temporary identifiers currently in use. The same associateId is linked to the same permanent identifier, regardless of which and how many temporary identifiers are allocated to the permanent identifier by the PDNG 8 of the EPC 10. The RNIS 16 may then use the associateId to identify the UE 2 for a data flow about which it provides radio network information to the edge servers 12, without knowing the IMSI for the UE 2 and without disclosing the IMSI to the edge servers 12. In other words, the RNIS 16 can (without knowing the IMSI for the UE) use the associateId to link data flows (current and/or past) that are for the same UE but have different temporary identifiers allocated by the PDNG 8.

More details of an example of operations of the edge servers 12 are described below, but the edge servers 12 may send a user profile information request to the UIS entity 18 using the associateID to specify the UE 2 for which user profile information is requested. The UIS entity 18 may then map the AssociateId for the UE 2 to the IMSI for the UE 2, and send a user profile information request to a subscriber database, using the IMSI to specify the UE 2 for which user profile information is requested. The UIS entity 18 then sends user profile information to the edge server 12, using the associateId to specify the UE 2 to which it relates, i.e. without disclosing the IMSI for the UE 2 to the edge server 12. The sending of user profile information to an edge server 12 may be conditional on the UIS entity 18 first determining that the request for user profile information includes an indicator that the edge server 12 is authorised to receive user profile information, e.g. a digital signature identifying the sender of the request as an entity authorised to receive user profile information.

An edge server 12 may send to the UIS entity 18 a request for the IMSI linked to an associateId. The UIS entity 18 may determine whether the IMSI request includes an indicator that the requesting edge server 12 is authorised to receive IMSI information, e.g. a digital signature identifying the sender of the IMSI request as an entity authorised to receive IMSI information. If the determination is positive, the UIS entity sends a message to the edge server 12 indicating the IMSI linked to the specified associateId.

Figure 2:
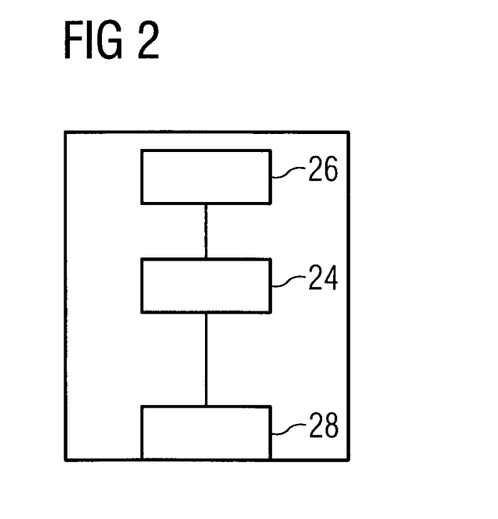
FIG. 2 illustrates an example of apparatus for use at each of the user identity service, radio network information service and edge servers of FIG. 1.

FIG. 2 illustrates an example of apparatus for use at each of the UIS entity 18, RNIS entity 16 and edge server 12. A processor 24, operating in accordance with program code stored at memory 26, carries out the computations discussed above and below, processes incoming messages from other entities via interface 28, and controls the generation and sending of messages to other entities via interface 28. Both the processor 24 and the memory 26 may be implemented as one or more chips. The memory 26 may include both read-only memory and random-access memory. The above elements may be provided on one or more circuit boards.

It should be appreciated that the apparatus shown in FIG. 2 and described above may comprise further elements which are not directly involved with the embodiments of the invention described hereafter.

The following description of examples of operations at processors at various entities of the above-described system involves the use of Representational State Transfer (REST) interfaces to exchange information between entities, but this is only one example of an implementation option.

Figure 3:
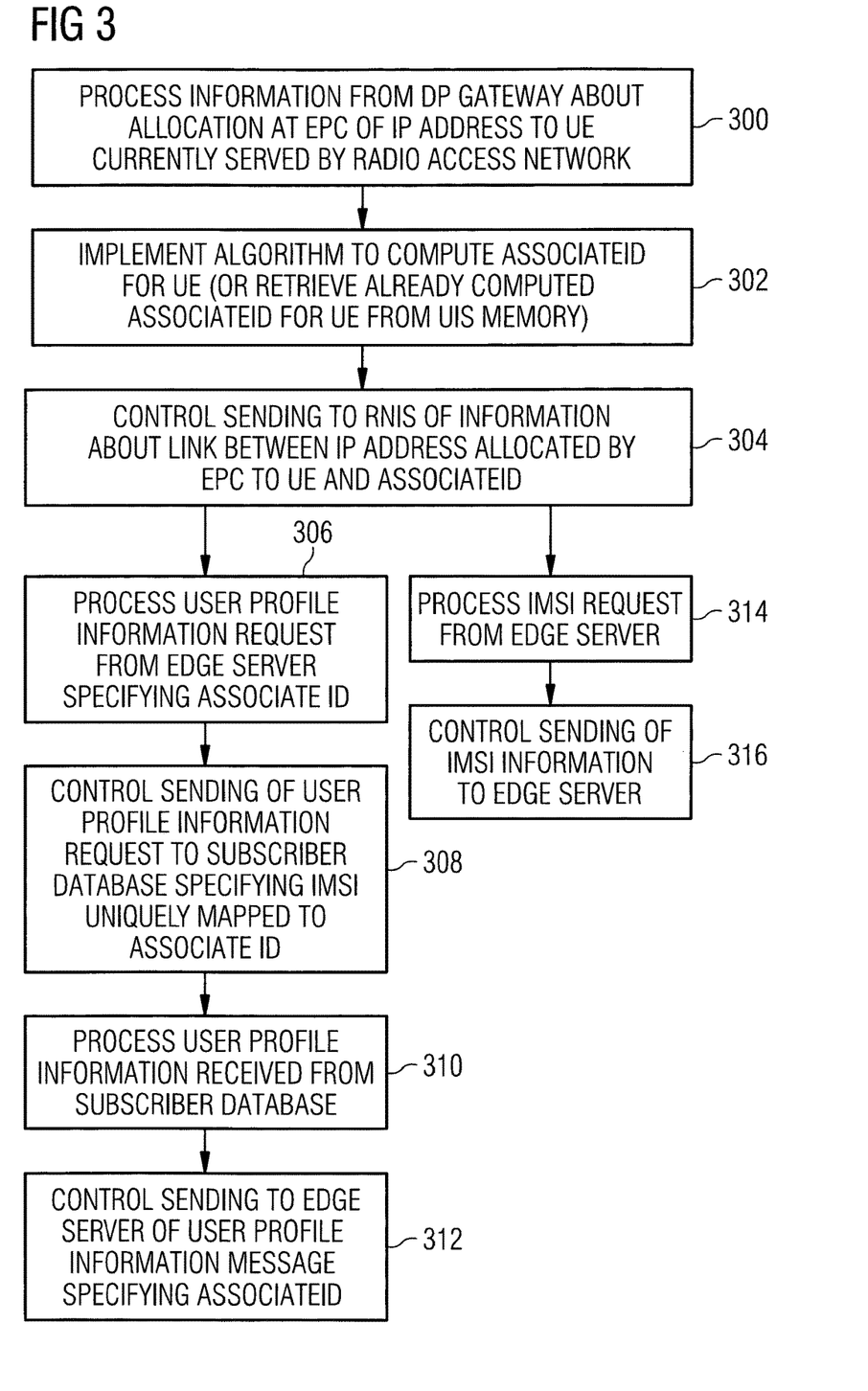
FIG. 3 illustrates an example of user identity service operations according to an embodiment of the present invention.

FIG. 3 illustrates one example of operations at a processor 24 at UIS 18. All operations follow program code stored at UIS memory 26.

The UIS processor 24 processes information received from the DP gateway 14 about the allocation at the PDNG 8 (of the EPC 10) of temporary identifiers (e.g. IP addresses) to UEs 2 currently served by the radio access network 4 (STEP 300). This may involve the UIS processor 24 controlling the generation and sending of a HTTPS POST request to the DP gateway 14 by which the DP gateway 14 registers the UIS entity 18 for receiving event information. For example, the DP gateway 14 may send a HTTPS POST request to the UIS entity 18 in response to events such as a UE 2 attaching to the radio access network 4 and being allocated a first temporary identifier by the EPC 10, or a UE 2 already served by the radio access network 4 being allocated a new radio access bearer. The HTTPS POST request includes the following information: the IMSI for the UE 2; the IP address allocated to the UE by the PDNG 8 of the EPC 10; the network address translation (NAT) of the IP address used at the DP gateway 14 for local traffic offload to edge server 12; and access and core side tunnel end point IDs. The DP gateway 14 may choose to add a NAT of the UE's IP address to the data plane flow before sending to the edge server 12.

The UIS processor processes the information in the above-mentioned HTTPS POST request received from the DP gateway, and stores in memory an associateId uniquely mapped to the IMSI for the UE (STEP 302), unless such a mapping already exists for the UE 2. For the mapping of associateId to IMSI, the UIS processor implements an algorithm that renders it effectively impossible to reverse compute the IMSI from the associateId, whereby the associateId provides a secure and unique user identity shielding the IMSI from any entity to which the associateId is disclosed.

The UIS processor controls the generation and sending of a HTTPS POST request message to the RNIS 16 informing the RNIS 16 of a link between the associateId and one or more of the temporary identifiers indicated in the event information received from the DP gateway 14 (STEP 304).

The UIS processor also processes any HTTPS POST request received (STEP 306) from an edge server 12 for user profile information specifying an associateId about which the edge server 12 may have learnt from information provided by the RNIS 16. The UIS processor 24 determines whether the request includes an indicator that the request is from an entity with authorization to receive user profile information. If the determination is negative, the UIS processor controls the generation and sending to the requesting edge server 12 of a message including an error code. On the other hand, if the determination is positive, the UIS processor determines from information stored in UIS memory the extent to which the requesting edge server is authorised to receive user profile information, and controls the generation and sending to a subscriber database entity 20 (which may or may not be part of the edge network comprising the edge servers, UIS, RNIS etc.) of a HTTPS GET request (STEP 308) specifying the IMSI mapped to the associateId specified in the user profile information request from the edge server 12. The UIS processor processes the user profile information received in response from the subscriber database entity 20 (STEP 310), and controls the generation and sending to the requesting edge server 12 of a HTTPS POST message specifying the associateId included in the user profile information request from the edge server 12, and including the user profile information that the edge server 12 is authorised to receive (STEP 312) (without disclosing the IMSI for the UE 2).

The UIS processor may also receive (STEP 314) from an edge server 12 a HTTPS GET request for the IMSI mapped to an associateId about which the edge server 12 may have learnt from information provided by the RNIS 16. The UIS processor 24 determines whether the request includes an indicator that the request is from an entity with authorization to receive IMSI information (STEP 314). If the determination is negative, the UIS processor controls the generation and sending to the requesting edge server 12 of a message including an error code. On the other hand, if the determination is positive, the UIS processor controls the generation and sending of a message specifying the IMSI mapped to the associateId specified in the IMSI request from the edge server (STEP 316).

The UIS processor also controls the generation and sending of messages including charging and audit details to network provider functions 22, including information about requests from the edge servers 12. This information may include one or more of: the number of requests from an edge server 12, the number of edge server requests to which the UIS provided user profile information and/or IMSI information; and the number of requests that the UIS rejected and did not provide user profile information and/or IMSI information.

Figure 4:
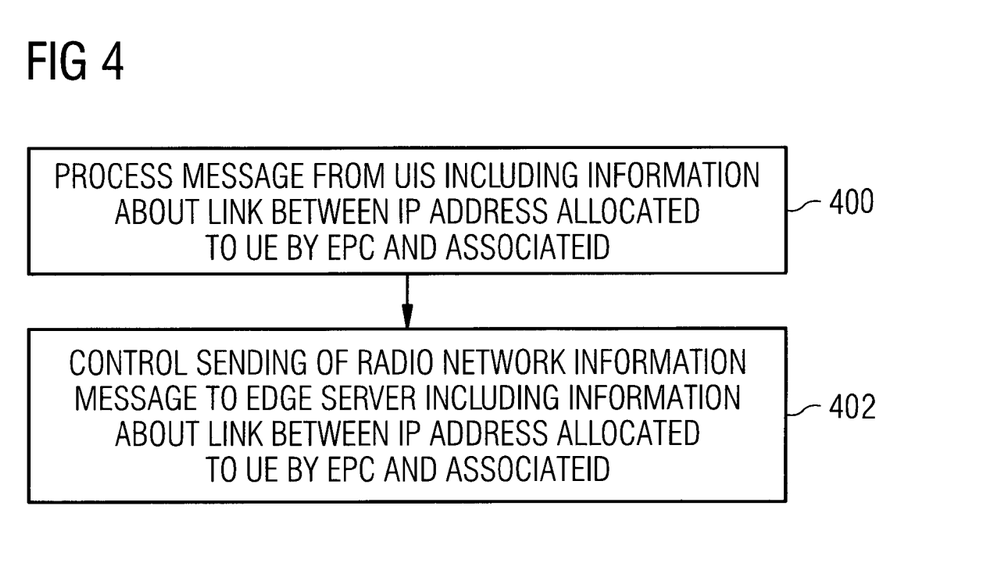
FIG. 4 illustrates an example of radio network information service operations according to an embodiment of the present invention.

FIG. 4 illustrates an example of operations at a processor 24 at the RNIS entity 16. All operations follow program code stored at RNIS memory 26.

The RNIS processor processes the above-mentioned HTTPS POST request from UIS entity 18 including information about linking between one or more temporary identifiers (e.g. IP addresses) and one or more associateIds (STEP 400). The RNIS processor controls the generation and sending of messages including this information to one or more edge servers 12 that are registered with the RNIS 16 for receiving radio network information (STEP 402).

Figure 5:
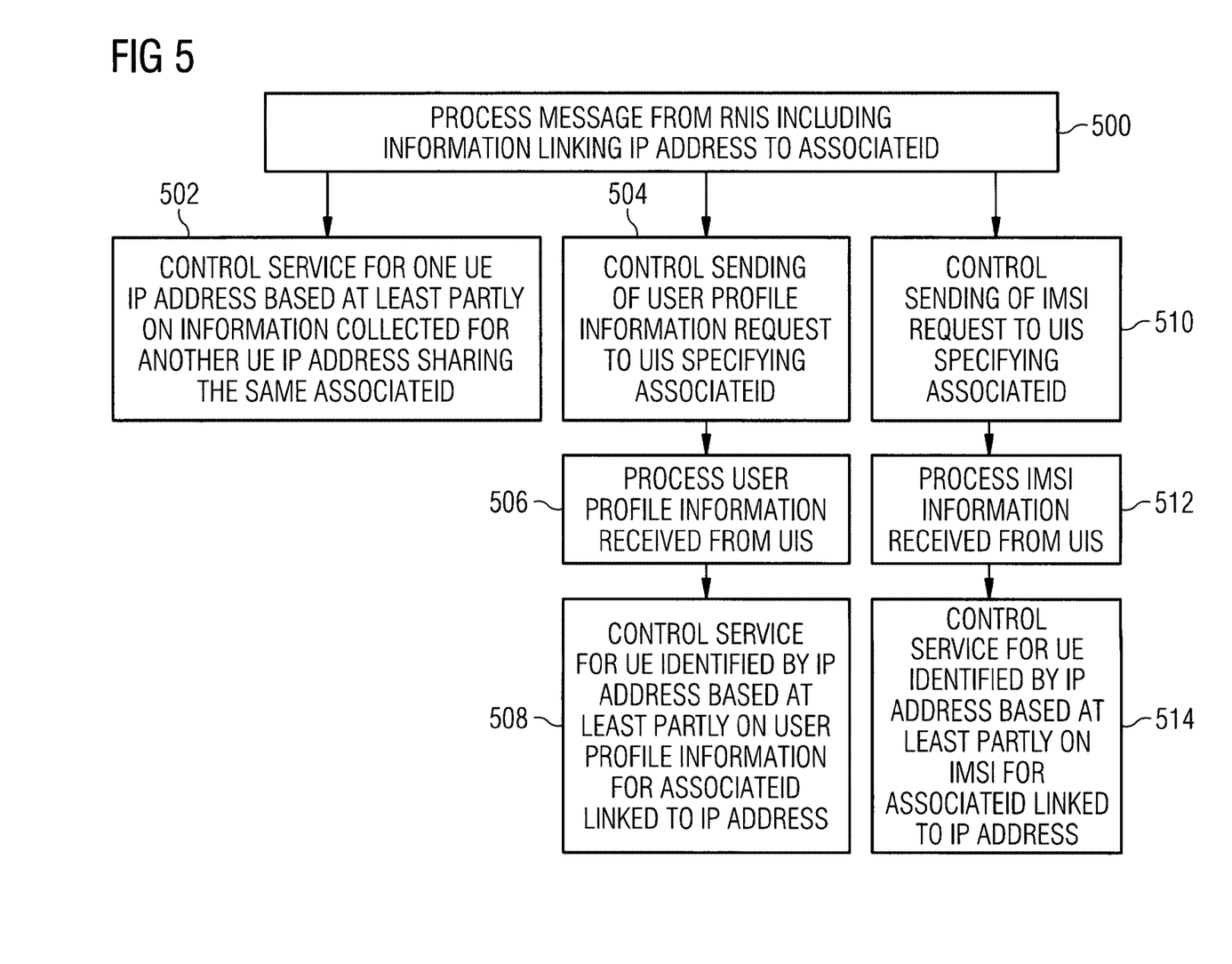
FIG. 5 illustrates an example of edge server operations according to an embodiment of the present invention.

FIG. 5 illustrates an example of operations at a processor 24 at an edge server 12. All operations follow program code stored at edge server memory 26.

The edge server processor receives the above-mentioned one or more messages from the RNIS 16, including information linking one or more temporary identifiers allocated by the PDNG 18 of the EPC 10 to one or more respective associateIds (STEP 500). The edge server processor uses this information to link temporary identifiers (past and/or current) for the same UE (whose IMSI is not known to the edge server 12). For example, analytics information collected in relation to one or more past temporary identifiers (e.g. one or more past IP addresses) may be used to tailor a service under a current temporary identifier (e.g. current IP address) linked to the same associateId as the one or more past temporary identifiers (STEP 502).

The service provided to a user by the edge server under a temporary identifier (e.g. IP address) may be further improved by having user profile information for that user. The edge server processor may control the generation and sending of a HTTPS POST message to the UIS 18 specifying the associateId that it knows to be linked to the temporary identifier from information received from RNIS 16 (STEP 504), and processes a HTTPS POST message from the UIS 18 including user profile information for the specified associateId (STEP 506). The edge server processor controls the service for a UE identified by an IP address, based at least partly on the user profile information for the associateId linked to the IP address (STEP 508).

The service provided to a user by an edge server 12 under a temporary identifier (e.g. IP address) may also be improved by knowing the IMSI for that user. The edge server processor may control the generation and sending of a HTTPS GET message to the UIS 18 specifying the associateId that it knows to be linked to the temporary identifier from information received from RNIS 16 (STEP 510), and receives a message from the UIS 18 including the IMSI for the specified associateId (STEP 512). The edge server processor controls the service for an UE identified by an IP address based at least partly on the IMSI for the associateId linked to the UE IP address (STEP 514).

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
   obtaining, by an apparatus, via an entity of a data plane gateway linking a radio access network to a core network associated with the radio access network, mapping information at the core network of one or more temporary user identifiers currently in use by at least one communication device to one or more permanent user identifiers, wherein the one or more permanent user identifiers are not included in data flows using the radio access network between the at least one communication device and the apparatus, and wherein the one or more permanent user identifiers are identifiers permanently linked to a communication device;
   linking, by the apparatus, to the one or more temporary user identifiers one or more third user identifiers; and
   informing, by the apparatus, a radio network information service entity of the linking between the one or more temporary user identifiers, wherein based on the one or more third identifiers the radio network information service entity identifies one or more computing devices for data flow and provides radio network information related to the one or more temporary identifiers to one or more computing entities, wherein the one or more computing entities serve one or more communication devices via the radio access network without routing via the core network.

2. The method according to claim 1, further comprising:
   receiving from one of said computing entities a user profile information request specifying one or more of said third identifiers; and
   sending to a user database a user profile information request specifying the one or more different identifiers mappable to said one or more third identifiers.

3. The method according to claim 2, wherein said sending is conditional on determining that said computing entity is authorised to receive user profile information.

4. The method according to claim 2, comprising:
   receiving user profile information from said user database; and sending at least part of said received user profile information to said computing entity.

5. The method according to claim 1, further comprising:
   obtaining user profile information for one or more of said temporary user identifiers from a user database via the one or more permanent user identifiers mapped to the one or more temporary user identifiers; and
   providing the user profile information for the one or more temporary user identifiers to one or more computing entities, which one or more computing entities serve one or more communication devices via the radio access network without routing via the core network.

6. The method according to claim 1, further comprising:
   providing information about the one or more permanent user identifiers mapped to one or more of said temporary identifiers to one or more computing entities, which one or more computing entities serve one or more communication devices via the radio access network without routing via the core network.

7. The method according to claim 6, wherein said providing information to one or more computing entities is conditional on determining that said one or more computing entities are authorised to receive said information.

8. The method according to claim 1, wherein dataflows between the at least one communication device and the apparatus are using a decentralized data plane gateway between the radio access network and the core network.

9. The method according to claim 1, wherein the at least one communication device comprises at least one user equipment, and wherein the apparatus comprises a server.

10. An apparatus comprising:
    a processor and memory including computer program code, wherein the memory and computer program code are configured to, with the processor, cause the apparatus to:
    obtain, via an entity of a data plane gateway entity linking a radio access network to a core network associated with the radio access network, mapping information at the core network of one or more temporary user identifiers currently in use by communication devices to one or more permanent user identifiers, wherein the one or more permanent user identifiers are not included in data flows using the radio access network between at least one communication device and the apparatus, and wherein the one or more permanent user identifiers are identifiers permanently linked to a communication device, link to the one or more temporary user identifiers one or more third user identifiers; and inform a radio network information service entity of the linking between the one or more temporary user identifiers, wherein based on the one or more third user identifiers the radio network information service entity identifies one or more computing devices for data flow and provides radio network information related to the one or more temporary user identifiers to one or more computing entities, wherein the one or more computing entities serve the one or more communication devices via the radio access network without routing via the core network.

11. The apparatus according to claim 10, wherein the memory and computer program code are further configured to, with the processor, cause the apparatus to:

receive from one of said computing entities a user profile information request specifying one or more of said third identifiers; and send to a user database a user profile information request specifying the one or more permanent user identifiers mappable to said one or more third identifiers.

12. The apparatus according to claim 11, wherein said sending is conditional on the apparatus determining that said computing entity is authorised to receive user profile information.

13. The apparatus according to claim 12, wherein the memory and computer program code are further configured to, with the processor, cause the apparatus to:

receive user profile information from said user database; and send at least part of said received user profile information to said computing entity.

14. The apparatus according to claim 13, wherein the memory and computer program code are further configured to, with the processor, cause the apparatus to:

obtain user profile information for one or more of said temporary user identifiers from a user database via the one or more permanent user identifier mapped to the one or more temporary user identifiers; and provide the user profile information for the one or more temporary user identifiers to one or more computing entities, which one or more computing entities serve one or more communication devices via the radio access network without routing via the core network.

15. The apparatus according to claim 10, wherein the memory and computer program code are further configured to, with the processor, cause the apparatus to:

provide information about the one or more permanent user identifiers mapped to one or more of said temporary identifiers to one or more computing entities, which one or more computing entities serve one or more communication devices via the radio access network without routing via the core network.

16. The apparatus according to claim 15, wherein said providing information to one or more computing entities is conditional on the apparatus determining that said one or more computing entities are authorised to receive said information.

* * * * *